April 4, 1961 J. E. CANDLIN, JR 2,977,898
RAILWAY COACH VEHICLE
Filed Feb. 23, 1956 3 Sheets-Sheet 1

INVENTOR
JAMES E. CANDLIN JR.
BY Wayne Morris Russell
ATTORNEY

April 4, 1961 J. E. CANDLIN, JR 2,977,898
RAILWAY COACH VEHICLE
Filed Feb. 23, 1956 3 Sheets-Sheet 2

INVENTOR
JAMES E. CANDLIN JR.
BY Wayne Morris Russell
ATTORNEY

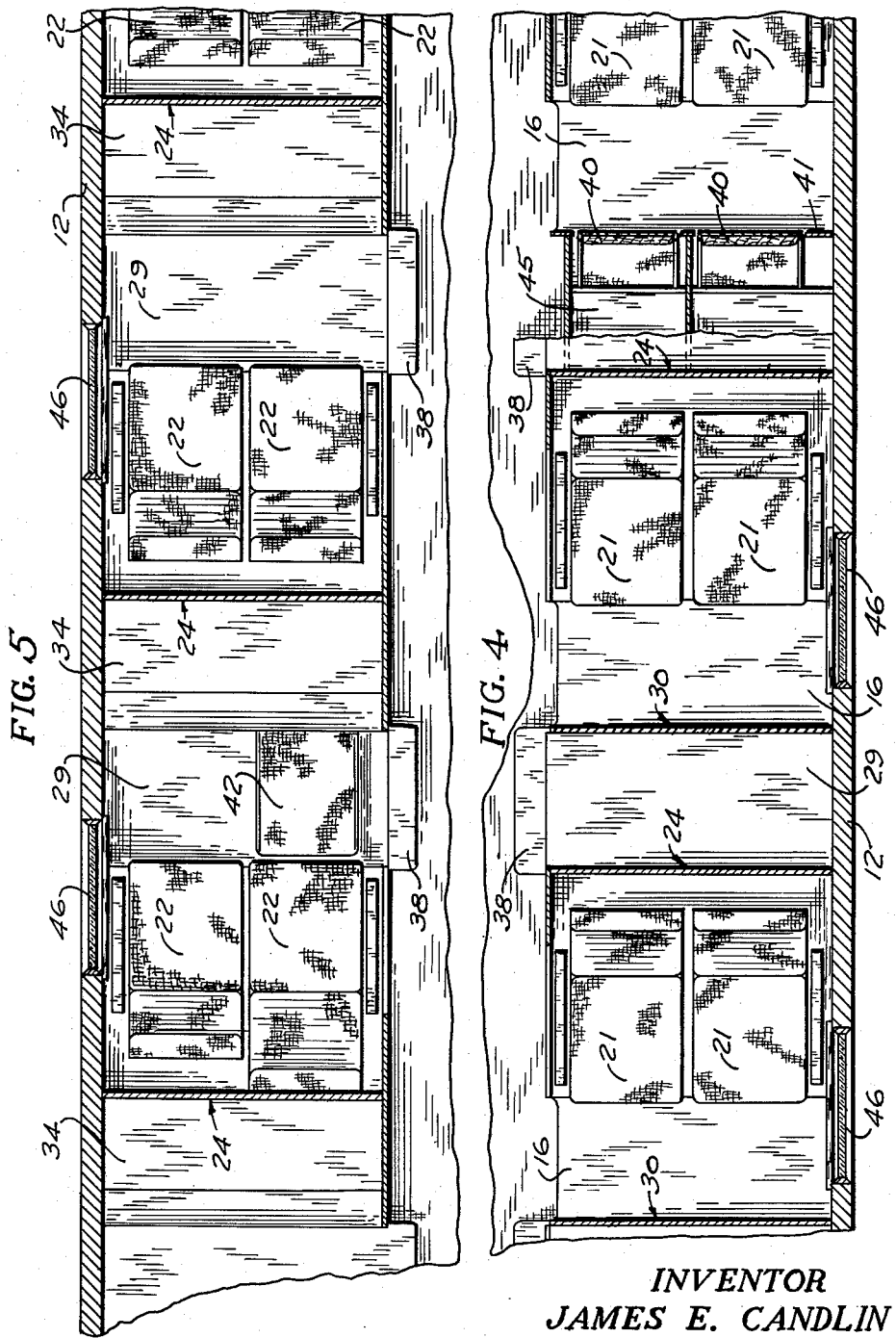

United States Patent Office 2,977,898
Patented Apr. 4, 1961

2,977,898

RAILWAY COACH VEHICLE

James E. Candlin, Jr., Lansing, Ill., assignor to Pullman Incorporated, a corporation of Delaware Filed Feb. 23, 1956, Ser. No. 567,190

1 Claim. (Cl. 105—340)

This invention relates to passenger vehicles of the coach type and is primarily concerned with the provision of leg rests for a railway passenger coach car.

One of the objects of the invention is to provide leg rests for a passenger vehicle of the coach type to give greater comfort to passengers.

Another object of the invention is to provide a passenger vehicle of the coach type having increased passenger capacity.

A further object of the invention is to provide a passenger coach vehicle having upper and lower rooms along each side wall with each upper room overlapping and extending between the adjacent pair of lower rooms and each upper room being separated from a rear lower room by a single partition and from a front lower room by a single partition and a longitudinal central aisle between rooms resulting in increased passenger capacity.

A further object of the invention is to provide leg rests for a passenger vehicle of the coach type to give greater comfort to passengers and at the same time increase the passenger capacity of the vehicle.

An important object of the invention is to provide ample luggage and parcel storage space for a passenger coach vehicle having leg rests.

The foregoing and other objects of the invention are attained by the construction and arrangement illustrated in the accompanying drawings wherein:

Figure 4 is a horizontal sectional view of one half of the car taken on the line 4—4 of Figure 1; and Figure 5 is a horizontal sectional view of the other half of the car taken on the line 5—5 of Figure 1.

Heretofore it has been the practice to build airplanes, railway cars and buses with foot rests for the passengers. One of the most irritating things in making long trips in one of these vehicles is the problem of what to do with one's feet. It is almost impossible to get some rest with one's feet confined to a small space between seats on the foot rest.

The invention proposes a passenger coach vehicle having leg rests to give greater comfort to passengers. The vehicle has a number of lower rooms along each side wall and a number of upper rooms along each side wall and each upper room overlaps and extends between the adjacent pair of lower rooms and each upper room is separated from a rear lower room by a single partition or end wall and from a front lower room by a single partition or end wall. The upper and lower rooms along each side wall are spaced apart to form a longitudinal central passageway. A pair of seats are disposed in each upper room and in each lower room. A leg rest is mounted opposite each seat in the upper and lower rooms and the leg rest is in a horizontal position when in use and may be moved to a vertical out of the way position when not in use. A separate space for luggage and a separate space for parcels is provided in each upper room and in each lower room. The particular room arrangement provides a vehicle with leg rests having a greater passenger capacity than a vehicle without leg rests and at the same time ample luggage and parcel storage space is provided.

Figure 1:
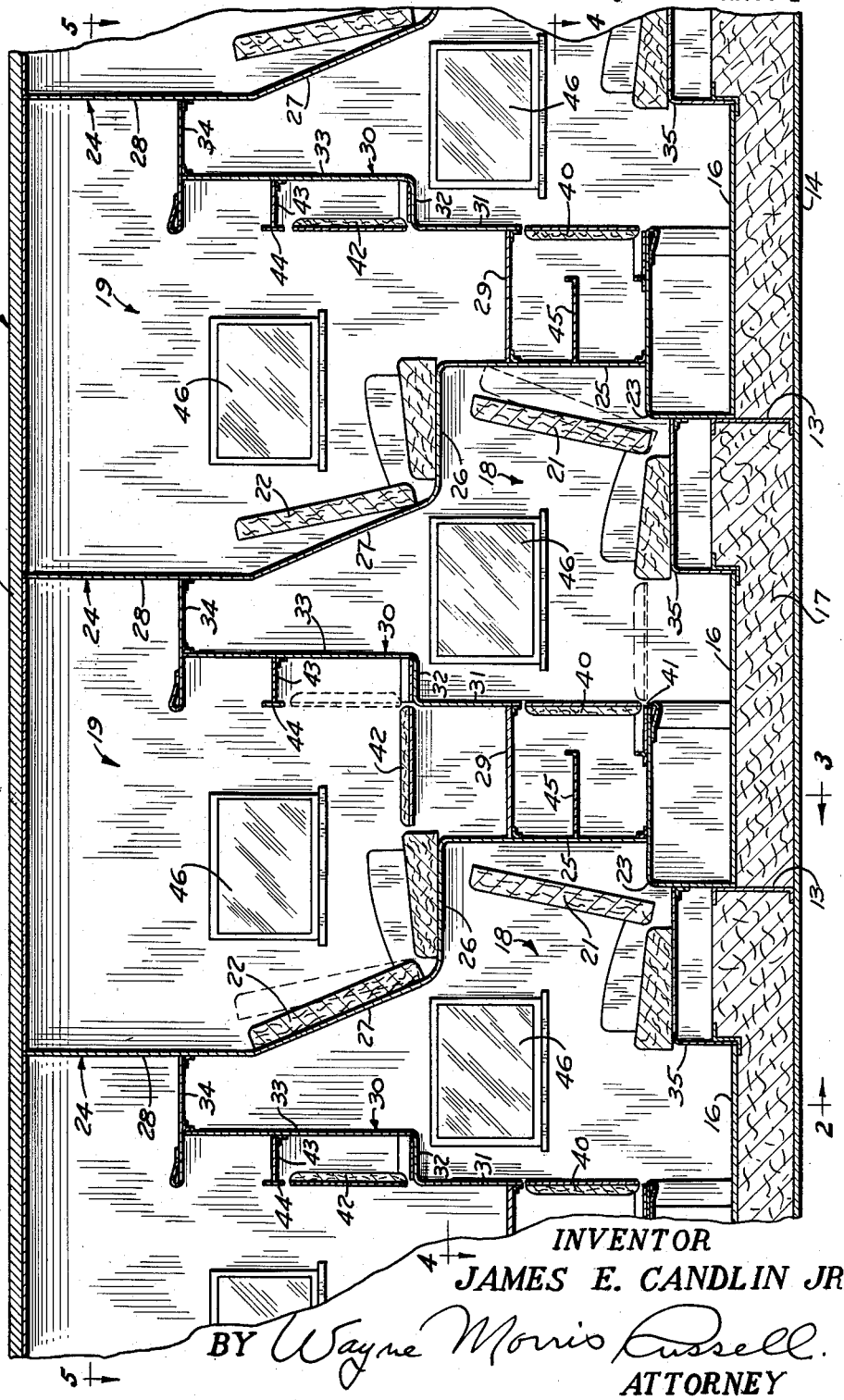
Figure 1 is a fragmentary longitudinal vertical sectional view of a railway passenger coach car taken through the rooms along one side wall of the car.
Figures 2, 3:
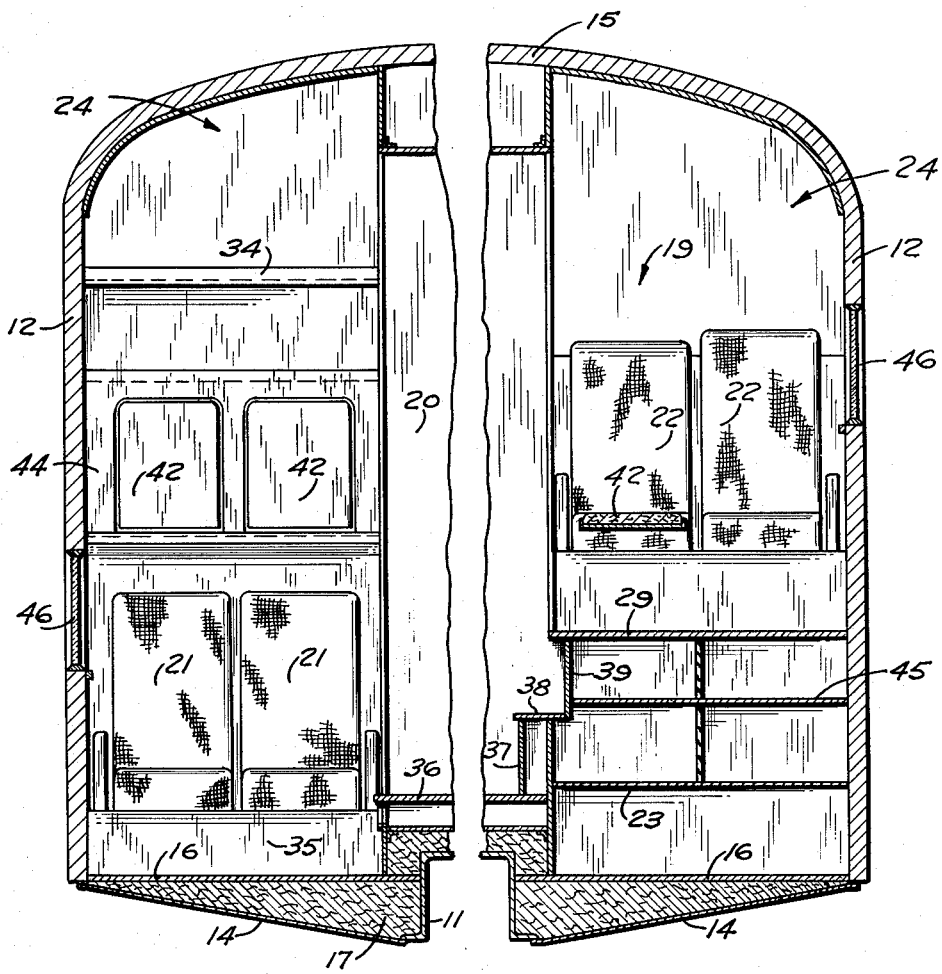
Figure 2 is a vertical cross sectional view of one half of the car taken on the line 2—2 of Figure 1.
Figure 3 is a vertical cross sectional view of the other half of the car taken on the line 3—3 of Figure 1.

In the drawings, 10 generally designates a passenger coach vehicle in the form of a railway passenger coach car. The car has a center sill 11, side walls 12, cross members 13, metal plating 14 extending between and secured to the adjacent center sill flange and the adjacent side wall, and a roof 15. A number of spaced lower floors 16 extend between and are secured to the adjacent center sill web and the adjacent side wall and insulating material 17 is disposed between the plating 14 and adjacent cross members 13 and the adjacent lower floor 16. A plurality of lower rooms 18 are disposed along each side wall 12 of the car and extend the major portion of the length of the car and a plurality of upper rooms 19 are disposed along each side wall of the car and extend the major portion of the length of the car. Each upper room 19 overlaps and extends between the adjacent pair of lower rooms 18. A passageway 20 is formed between lower and upper rooms 18 and 19 at opposite side walls of the car and extends longitudinally centrally of the car for the major portion of the length of the car. A pair of seats 21 are disposed in each lower room 18 and face in one direction of the car and a pair of seats 22 are disposed in each upper room 19 and face in the opposite direction of the car. A support 23 extends between the passageway 20 and the adjacent side wall 12 and has a vertical portion and a horizontal portion secured to the vertical portion and the vertical portion of the plate is secured to the adjacent cross member 13 and the adjacent lower floor 16. A partition or end wall 24 has a width equal to the distance between the passageway 20 and the adjacent side wall 12 of the car and has a vertical planar portion 25 disposed on the horizontal portion of plate 23 and an angle is secured to the horizontal portion and the vertical portion. A horizontal planar portion 26 is secured to the vertical portion 25 and the seat cushion is mounted on the horizontal portion and a sloping planar portion 27 is secured to the horizontal portion and the seat back may be moved against the sloping portion and another vertical planar portion 28 is secured to the sloping portion and extends to and is secured to the roof. A number of upper floors 29 are spaced above the adjacent lower floor 16 and extend from the passageway 20 to the adjacent side wall 12 and a supporting angle is secured to the adjacent vertical portion 25 and the adjacent upper floor. A partition or end wall 30 has a width equal to the distance between the passageway 20 and the adjacent side wall 12 and has a vertical portion 31 and a supporting angle is secured to the adjacent upper floor 29 and the vertical portion and a horizontal portion 32 is secured to the vertical portion and another vertical portion 33 is secured to the horizontal portion and a horizontal support 34 is disposed against the portion 28 and a supporting angle is secured to the support and the portion 28 and the support is also disposed on the portion 33 and a supporting angle is secured to the support and to the portion 33 and the support extends inwardly into the adjacent upper room 19 beyond the portion 33. A seat support 35 extends between the passageway 20 and the adjacent side wall 12 and has a vertical portion and a horizontal portion secured to the vertical portion and has the vertical portion disposed against the adjacent lower floor 16 and a supporting angle is secured to the floor and the vertical portion and the horizontal portion is disposed against the support 23 and a supporting angle is secured to the horizontal portion and the support 23. Each of the seats 21 is mounted upon the horizontal portion of seat support 35. A floor 36 is spaced above the lower floors 16 and extends the major portion of the length of the car and forms the bottom of the passageway 20. A vertical wall 37 is disposed on and secured to the floor 36 and a horizontal member 38 is disposed on and secured to the wall and a vertical wall 39 extends between and is secured to the member and the adjacent upper floor 29. The member 38 is used as a step to gain access to the adjacent upper room 19. A pair of leg rests 40 are disposed in each lower room 18 and each leg rest has its lower end pivotally mounted on the end wall 30 on the horizontal portion of support 23 at the inner edge of the horizontal portion. Each leg rest 40 is swingable to a horizontal position when a passenger desires to use the leg rest and is swingable to a vertical position when not in use. A vertical wall 41 is disposed in each lower room 18 and is secured to the horizontal portion of the adjacent support 23 and is secured to the portion 31 of partition 30 and has a pair of spaced openings to receive the leg rests 40. A pair of leg rests 42 are disposed in each upper room 19 and each leg rest has its lower end pivotally mounted on the end wall 30 on the adjacent horizontal portion 32. A horizontal support 43 extends from the passageway 20 to the adjacent side wall 12 and a supporting angle is secured to the support and the adjacent vertical portion 33 and a vertical wall 44 is secured to the horizontal portion 32 and the support and has a pair of openings to receive the leg rests 42 when it is desired to move the leg rests to their vertical nonuse position. The space between the support 23 and the adjacent lower floor 16 provides a compartment used to store luggage. A horizontal shelf member 45 extends between and is secured to the wall 39 and the adjacent side wall 12 and is also secured to the adjacent vertical portion 25 and the space between member 45 and support 23 is used for the storage of hats and coats with the support 23 serving as a shelf. The space between member 45 and the adjacent upper floor 29 is used for the storage of parcels. A vertical wall parallel to the adjacent side wall 12 extends between the horizontal portion of the support 23 and the adjacent upper floor 29 and has an inwardly extending slot in one side edge to receive member 45. The support 43 in each upper room 19 provides a shelf used for the storage of parcels and the support 34 provides a shelf used to store luggage. When a passenger in one of the rooms 18 or 19 desires to use the leg rests he moves the leg rest from the vertical position to the horizontal dotted line position and places his legs upon the leg rest and moves the seat back to the dotted line position all as shown in Figure 1. When the passenger is through using the leg rest he moves it to the vertical full line position shown in Figure 1. Each upper room and each lower room is provided with a window 46.

The railway passenger coach car illustrated without smoking rooms and with leg rests has a passenger capacity of eighty while a conventional railway passenger coach car without smoking roms and without leg rests has a passenger capacity of only seventy-six. Thus with applicant's room arrangement and leg rests applicant's coach car has a greater passenger capacity than the conventional coach car without leg rests. Even though the passenger capacity in applicant's car is greater and even though leg rests are provided there is still ample space for the storage of luggage and parcels. The leg rests give greater comfort to passengers.

From the foregoing it will be seen that there has been provided a passenger coach vehicle having leg rests giving greater comfort to passengers and increased passenger capacity over conventional coach cars and ample luggage and parcel storage space.

What is claimed is:

In a passenger coach vehicle having side walls, a longitudinal center aisle floor and a roof, a plurality of double occupancy lower rooms along each side wall and each room having a floor spaced below the level of said aisle floor, a plurality of double occupancy upper rooms along each side wall and each room having a floor spaced above the level of said aisle floor, said lower and upper rooms being disposed in alternate relation substantially throughout the length of said vehicle and each pair of lower and upper rooms being separated by a first single partition from an adjacent pair of lower and upper rooms and each lower room being separated from an adjacent upper room by a second single partition, each lower and upper room being of a width for two occupants extending from one side of said center aisle floor to the adjacent side wall of said vehicle, each said first partition comprising a plurality of planar portions extending full width of said rooms and including a lower vertical portion in longitudinally spaced relation with an upper vertical portion, said lower vertical portion extending upwardly substantially from the lower room floor to a connected horizontal portion, said horizontal portion being spaced above the level of said upper room floor and extending rearwardly to a connected sloping portion, said sloping portion extending upwardly and rearwardly to said upper vertical portion and connected thereto, said upper vertical portion extending upwardly to the roof of said vehicle, each said second partition extending full width of said rooms and including a top horizontal portion spaced below the roof of said vehicle and secured to the upper vertical portion of one of said first partitions and extending rearwardly to a connected upper vertical portion, said upper vertical portion extending downwardly to a connected intermediate horizontal portion, said intermediate horizontal portion spaced above the level of said upper room floor and extending rearwardly to a connected lower vertical portion, said lower vertical portion extending downwardly and terminating at said upper room floor, a seat of a width for two occupants in each upper room mounted on the horizontal portion of the first partition and facing forwardly and a seat of a width for two occupants in each lower room disposed beneath the horizontal portion of the first partition and facing rearwardly, said upper and lower room seats being in vertical alignment and occupying the same space longitudinally of the vehicle, a pair of leg rests in each upper room movably mounted in the second partition at the intermediate horizontal portion thereof and each leg rest being movable to a use position adjacent to and in horizontal alignment with the seat cushion of said upper room seat, a compartment opposite the seat in each lower room providing a space for luggage, and a pair of leg rests in each lower room movably mounted on the luggage compartment and each leg rest being movable to a use position adjacent to and in horizontal alignment with the seat cushion of said lower room seat.

References Cited in the file of this patent
UNITED STATES PATENTS

| | | |
|---|---|---|
| 2,464,749 | Murphy | Mar. 15, 1949 |
| 2,478,402 | Jones | Aug. 9, 1949 |
| 2,536,194 | Loewy | Jan. 2, 1951 |
| 2,548,292 | Eksergian | Apr. 10, 1951 |
| 2,567,894 | Reinke et al. | Sept. 11, 1951 |
| 2,599,606 | Burgess | June 10, 1952 |
| 2,632,408 | Giles | Mar. 24, 1953 |
| 2,732,814 | Murphy et al. | Jan. 31, 1956 |
| 2,808,787 | Murphy | Oct. 8, 1957 |

OTHER REFERENCES

"Car Builders' Cyclopedia," 19th ed., 1953, Simmons-Boardman Publ. Corp., New York, N.Y. (Copy received in Patent Office October 5, 1953, and located in Division 34.)